US006828784B2

United States Patent
Yun et al.

(10) Patent No.: US 6,828,784 B2
(45) Date of Patent: Dec. 7, 2004

(54) METHOD AND APPARATUS DETECTING BASE LINE POPPING NOISE IN A READ HEAD AND STABILIZING THE MAGNETIC DOMAIN OF MERGED MAGNETORESISTIVE READ-WRITE HEADS USING DC WRITE CURRENT AND READ BIAS CURRENT FOR AN ASSEMBLED DISK DRIVE

(75) Inventors: Jong Yun Yun, Cupertino, CA (US); Jae June Kim, Sunnyvale, CA (US); Chin Won Cho, San Jose, CA (US); Chang Dong Yeo, Jook Gun-Li (KR)

(73) Assignee: Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/226,404

(22) Filed: Aug. 22, 2002

(65) Prior Publication Data

US 2003/0151403 A1 Aug. 14, 2003

Related U.S. Application Data

(63) Continuation-in-part of application No. 10/074,614, filed on Feb. 11, 2002, now Pat. No. 6,593,736.

(51) Int. Cl.[7] ........................ G01R 33/12; G11B 27/36

(52) U.S. Cl. ........................ 324/210; 324/212; 360/25; 360/31

(58) Field of Search ................... 324/210, 212, 324/537; 360/6, 25, 31, 46

(56) References Cited

U.S. PATENT DOCUMENTS

| 6,018,428 | A | * | 1/2000 | Okamura | ...................... 360/25 |
| 6,137,643 | A | * | 10/2000 | Flynn | ........................... 360/25 |
| 6,178,053 | B1 | * | 1/2001 | Narita | .......................... 360/25 |
| 6,421,193 | B1 | * | 7/2002 | Li | ................................ 360/25 |
| 6,494,085 | B2 | * | 12/2002 | Wakefield et al. | ............ 73/105 |
| 6,671,111 | B2 | * | 12/2003 | Ottesen et al. | ................ 360/31 |

\* cited by examiner

*Primary Examiner*—N. Le
*Assistant Examiner*—Darrell Kinder
(74) *Attorney, Agent, or Firm*—Gregory Smith & Assoc.; Jeffrey Aiello; Earle Jennings

(57) ABSTRACT

Methods and apparatus are disclosed determining the presence of base line popping noise for a read head inside an assembled disk drive, as well as, determining read bias conditions for operating the read head free of base line popping noise. These further include performance evaluation of the read head for read bias conditions free of base line popping noise. They also include repairing the read head using DC write current and read bias current within the assembled disk drive.

28 Claims, 18 Drawing Sheets

TA_threshold small

TA_threshold small

METHOD AND APPARATUS DETECTING BASE LINE POPPING NOISE IN A READ HEAD AND STABILIZING THE MAGNETIC DOMAIN OF MERGED MAGNETORESISTIVE READ-WRITE HEADS USING DC WRITE CURRENT AND READ BIAS CURRENT FOR AN ASSEMBLED DISK DRIVE

CROSS REFERENCE TO RELATED APPLICATION

This application is a continuation in part of U. S. patent application Ser. No. 10/074,614, filed Feb. 11, 2002, entitled "METHOD AND APPARATUS STABILIZING THE MAGNETIC DOMAIN OF MERGED MAGNETORESISTIVE READ-WRITE HEADS USING DC WRITE CURRENT AND READ BIAS CURRENT" issued as U.S. Pat. No. 6,593,736 on Jul. 15, 2003.

TECHNICAL FIELD

This invention relates to detection of base line popping noise by a read head and the stabilization of the magnetic domain of that read head for a merged type magnetoresistive head used in an assembled disk drive, including GMR (Giant Magneto-Resistive) read-write heads.

BACKGROUND ART

Disk drives are an important data storage technology. Read-write heads are one of the crucial components of a disk drive, directly communicating with a disk surface containing the data storage medium. This invention detects base line popping and corrects this and other Electro-Static Discharge (ESD) damage to the pinned layer of the read head in an assembled disk drive. Detection reconfigures and uses thermal asperity detection circuitry included in the channel interface. Correction uses a write current applied to the write inductive coil and a read current bias applied to the read head.

FIG. 1A illustrates a typical prior art high capacity disk drive 10 including actuator arm 30 with voice coil 32, actuator axis 40, suspension or head arm 50 with slider/head unit 60 placed among the disks.

FIG. 1B illustrates a typical prior art high capacity disk drive 10 with actuator 20 including actuator arm 30 with voice coil 32, actuator axis 40, head arms 50–56 and slider/head units 60–66 with the disks removed.

Since the 1980's, high capacity disk drives 10 have used voice coil actuators containing 20, 30, 32, 40, 50, 52, 54, 56, 60, 62, 64, and 66 to position their read-write heads over specific tracks. The heads are mounted on head sliders 60–66, which float a small distance off the disk drive surface when in operation. Often there is one head per head slider for a given disk drive surface. There are usually multiple heads in a single disk drive, but for economic reasons, usually only one voice coil actuator.

Voice coil actuators are further composed of a fixed magnet actuator 20 interacting with a time varying electromagnetic field induced by voice coil 32 to provide a lever action via actuator axis 40. The lever action acts to move head arms 50–56 positioning head slider units 60–66 over specific tracks with speed and accuracy. Actuator arms 30 are often considered to include voice coil 32, actuator axis 40, head arms 50–56 and head sliders 60–66. Note that actuator arms 30 may have as few as a single head arm 50. Note also that a single head arm 52 may connect with two head sliders 62 and 64.

Merged type heads possess different components for reading and writing, because the magneto-resistive effect only occurs during reading. A merged type head typically includes a thin film head and a spin valve sensor. The primary use of the thin film head is in the write process. The spin valve sensor is used for reading.

Merged Magneto-Resistive (MR) heads have several advantages over earlier approaches, using a single component, for both read and write. Earlier read-write heads were a study in tradeoffs. The single component, often a ferrite core, can increase read sensitivity with additional windings around the core. However, these added windings make the ferrite core write less efficiently.

Introduced in the 1990's, merged heads brought significant increases in areal density. A merged type head reads the disk surface using a spin valve, containing a conductive thin film, whose resistance changes in the presence of a magnetic field. By separating the functions of writing and reading, each function can be optimized further than would be possible for the older read-write heads. For all the improvement that merged heads bring, there remain problems. However, before discussing these problems, consider first how and what controls these devices in contemporary disk drives.

FIG. 2A illustrates a simplified schematic of a disk drive controller 1000 controlling an analog read-write interface 220, write differential signal pair (w+ and w−), and the read differential signal pair (r+ and r−) communicating resistivity found in the spin valve within MR read-write head 200 of the prior art.

Analog read-write interface 220 frequently includes a channel interface 222 communicating with pre-amplifier 224. Channel interface 222 receives commands setting at least the read_bias, write_bias, and thermal asperity detection threshold(s), denoted as TA_threshold in FIG. 2A.

Various disk drive analog read-write interfaces 220 may employ either a read current bias or a read voltage bias. By way of example, the resistance of the read head is determined by measuring the voltage drop (V_rd) across the read differential signal pair (r+ and r−) based upon the read bias current setting read_bias, using Ohm's Law.

Most disk drives found in the prior art contain a Thermal Asperity Detection (TAD) signal as shown in FIG. 2A. The Analog read/write interface 220 generates TAD, which is sent to the embedded disk controller 1000. The embedded disk controller 1000 of the prior art contains a computer 1100 interacting 1122 with a memory 1120. The memory 1120 contains the prior art program system 1200.

FIG. 2B illustrates a suspended head slider 60 containing the MR read-write head 200 of the prior art.

FIG. 2C illustrates a perspective view of merged read-write head 200 from FIG. 2B including write inductive head 202 and magnetoresistive read head (or spin valve) 204 of the prior art.

FIG. 2D illustrates a simplified cross section view of spin valve 204 with a region 206 composed of multiple layers forming the active region of spin valve 204 of FIG. 2C of the prior art.

FIG. 2E illustrates a more detailed cross section view of region 206 of FIG. 2D, a typical GMR spin valve of the prior art.

Region 206 contains Anti-FerroMagnetic (AFM) exchange film 208 deposited on pinned Ferro-Magnetic (FM) layer 210, over a copper (Cu) spacer layer 212 in turn deposited over free layer 214 on top of under layer 216 as typically found in a GMR spin valve of the prior art.

A GMR sensor is usually fabricated as follows: AFM layer 208 primarily composed of PtMn (Platinum Manganese). Pinned FM layer 210 is primarily composed of Co (Cobalt) NiFe (permalloy). The free layer 214 is primarily composed of NiFe permalloy. Under layer 216 is often composed primarily of Tantalum (Ta).

There is a distribution blocking temperature between layers 208 and 210. When the temperature of spin valve 204 exceeds the distribution blocking temperature, the exchange coupling between AFM layer 208 and FM pinned layer 210 vanishes.

During the manufacture and handling of spin valve 204, the magnetization of pinned layer (FM layer 210) may be reversed or rotated by 180 degrees due to an ESD event. The magnetization of the free layer may also be altered by an ESD event.

Note that the entire spin valve 204 is vertically located between shields S1 and S2 of FIG. 2C as will be illustrated in FIGS. 3A and 3B.

FIG. 2F illustrates normal magnetization of a spin valve read head as well as magnetization damage from ESD events as known in the prior art.

The AFM layer 208 will typically have a magnetization direction 300. Pinned layer 210 will normally have magnetization direction 310, but after one or more ESD events, may have a magnetization direction such as indicated by 312 or 314. The Cu spacer layer 212 is not specifically relevant in this discussion and is not illustrated here. Free layer 214 normally has a magnetization direction 320 and after damage from one or more ESD events, may have an altered magnetization direction as indicated by 322.

Normally, AFM layer 208 and pinned layer 210 have essentially parallel magnetization directions and free layer 214 is magnetized essentially perpendicular to layers 208 and 210. Operation of the spin valve read head 204 depends upon these directional relationships.

FIG. 2G illustrates an even more detailed cross section view of region 206 of FIGS. 2D and 2E, a typical GMR spin valve of the prior art.

Note that layer 210 is further decomposed into an AP1 Layer, an AFC layer, and an AP2 layer.

Generally, the read head operates with a meta-stable magnetic structure. The meta-stable structure refers to a single magnetic domain at AP1, made by the strong exchange field from AFM and AP1. The meta-stable structure also refers to a single domain at free layer 214, made by the hard magnet bias. Ideally, under the meta-stable magnetic structure, free layer 214 should have stable magnetic rotation.

Magnetic single meta-stable domains naturally tend to be random, and are called "multi-magnetic domains". Base Line Popping Noise BLPN is a name for instability in a GMR head. BLPN is most likely caused by multi-magnetic domain phenomena. The multi-magnetic domain phenomena is generally caused by electrical overstress or mechanical damage of the MR sensor. Electrical overstress is often the result of electro-static discharge. The multi-magnetic domain tends to be formed at junction and boundary regions.

FIGS. 3A and 3B illustrate the magnetic flux direction related to the charging of the write differential signal pair connecting to P1 and P2 of the prior art. P1 is related with AP1, P2 is related with AP2.

FIG. 3A illustrates the magnetic flux D1 which results from the current flowing from P1 to P2, when there is a positive write current asserted on the write differential signal pair under normal conditions in the prior art.

FIG. 3B illustrates the magnetic flux D2 which results from the current flowing from P2 to P1, when there is a negative write current asserted on the write differential signal pair under normal conditions in the prior art.

Electro-Static Discharge (ESD) can diminish or damage the pinning part of the spin valve head 204 creating a weakened or reversed magnetic condition as discussed in FIG. 2F. Such conditions damage or destroy the ability of the spin valve 204 in the MR read-write head 200 to function.

FIG. 3C illustrates a weak hard magnetic field due to edge domain problems based upon FIG. 2G leading to the phenomena of FIG. 3D as found in the prior art.

FIG. 3D illustrates the mechanism leading to base line popping due to unstable edge domain rotation as found in the prior art.

FIG. 3C illustrates a weak hard magnetic field. This allows the edge domain field to be easily moved by weak external forces. Note that the hard magnetic domain amplitude may be weak due to a large dead zone in the hard magnetic domain.

While the discussion of FIGS. 3C–3D has been made based upon edge domain effects, the same discussion applies to boundary magnetic domain effects leading to base line popping noise effects.

FIG. 4A depicts the ideal voltage amplitude measured across the read differential signal pair sensing a written pulse on a disk drive surface in the prior art.

As used in the prior art, the amplitude is defined as $V_+ + V_-$. Asymmetry is defined as $V_+ - V_-$. The ideal situation would have a ratio of asymmetry to amplitude of 0%, but acceptable ranges are often 5% to 10%, with 7% being typical for a spin valve. ESD tends to decrease the amplitude and increase the asymmetry.

FIG. 4B illustrates base line popping noise (BLPN), a condition often adversely affecting the quality of a spin valve and resulting from certain unstable read-write heads as known in the prior art.

Base line popping can lead to false detection of peaks (1) and troughs (0) as illustrated in FIG. 4B.

Channel Statistical Measurements (CSM) are a standard system used in assembled disk drives to measure channel performance. It measures amplitude. Note that even knowing the asymmetry of a channel cannot determine the presence of base line popping noise. What is needed is a method to determine base line popping noise for specific channel conditions in an assembled disk drive.

The testing of disk drives by CSM gives only a partial quality measure. A more thorough quality measure is to determine the Bit Error Rate (BER).

The prior art teaches repairing ESD damaged and unstable read heads by raising the read head temperature above the blocking temperature and generating a magnetic field across the read head. The prior art teaches applying a high read bias current to heat the read head, often using more than 10 mA, which may melt the read head. Sometimes an external magnetic field is used, requiring an external magnet, its power supply, and mechanical infrastructure positioning the external magnet with respect to the mechanical housing of the read-write head.

The prior art approach to repairing ESD damaged and unstable read heads has both reliability and cost problems associated with it. The external magnet and its requirements add to the cost of repair and, thus, the total cost of manufacture.

FIG. 4C illustrates a thermal asperity event as found in the prior art, causing another kind of distortion to the desired waveform shown in FIG. 4A.

A thermal asperity event occurs when the read head collides with a particle on the disk surface which results in a spike in the differential read signal pairs as illustrated in FIG. 4C.

Most disk drives found in the prior art contain a Thermal Asperity Detection (TAD) signal as found in FIG. 2A previously. The prior art teaches setting TA_threshold to pass signals such as found in FIG. 4A, making the circuit useless for detecting base line popping noise as illustrated in FIG. 4B.

To summarize, what is needed is a method of detecting base line popping noise in an assembled disk drive. A method of full scale testing, within the disk drive, using the Bit Error Rate and avoiding conditions exhibiting base line popping noise, is further needed. If a disk drive is defective, an internal method of repairing the read head is needed.

SUMMARY OF THE INVENTION

The invention includes methods diagnosing and repairing read heads of merged magnetoresistive read-write heads within an assembled disk drive. The invention includes disk drives implementing such methods. The invention addresses at least the problems found in the prior art approaches.

One of the inventors realized that since base fine popping only happens when the read differential signal pair is near zero, by zeroing a track and reading that track, base line popping would be the strong effect. By setting the thermal asperity threshold small, TAD would detect the presence of base line popping when reading the zeroed track.

The invention includes determining the presence of base line popping noise for a given read head by placing the thermal asperity threshold(s) close to ground, and counting thermal asperity events while reading a zeroed track at a given read bias condition. Determining the presence of base line popping is based upon thermal asperity event counts greater than zero. Note that the invention includes combinations of thermal asperity threshold settings and TAD counts greater than some other constant than zero determining the presence of base line popping noise.

This is the only method the inventors know of which can determine the presence of base line popping noise in an assembled disk drive. This brings a new level of quality to the manufacturing of disk drives.

The invention includes determining read bias conditions free of base line popping noise in the assembled disk drive. This is done by performing the steps of determining the presence of base line popping noise for each member of a collection of read bias conditions and selecting those read bias condition members with thermal asperity event counts of zero.

The invention improves full scale testing of the read head by using the Bit Error Rate method for read bias conditions free of base line popping noise.

The invention includes repairing an assembled disk drive's read head exhibiting base line popping. A write current source applies a write current level onto the write differential signal pair causing the write head to induce a temperature rise in the read head. A magnetic field within the read head is created by a read current source applying a read current level onto the read differential signal pair. The read current and write current are maintained for at least a time period to effect repair.

These and other advantages of the present invention will become apparent upon reading the following detailed descriptions and studying the various figures of the drawings.

DETAILED DESCRIPTION OF THE INVENTION

The invention includes a method diagnosing base line popping as well as repairing damaged read heads of merged magnetoresistive read-write heads in an assembled disk drive. Diagnosing the read head entails setting the thermal asperity threshold TA_threshold small, and counting thermal asperity events on a zeroed track. Repairing the read heads is done without the use of high read bias current to heat the read head. The invention addresses at least the problems found in the prior art approaches.

Figure 5:
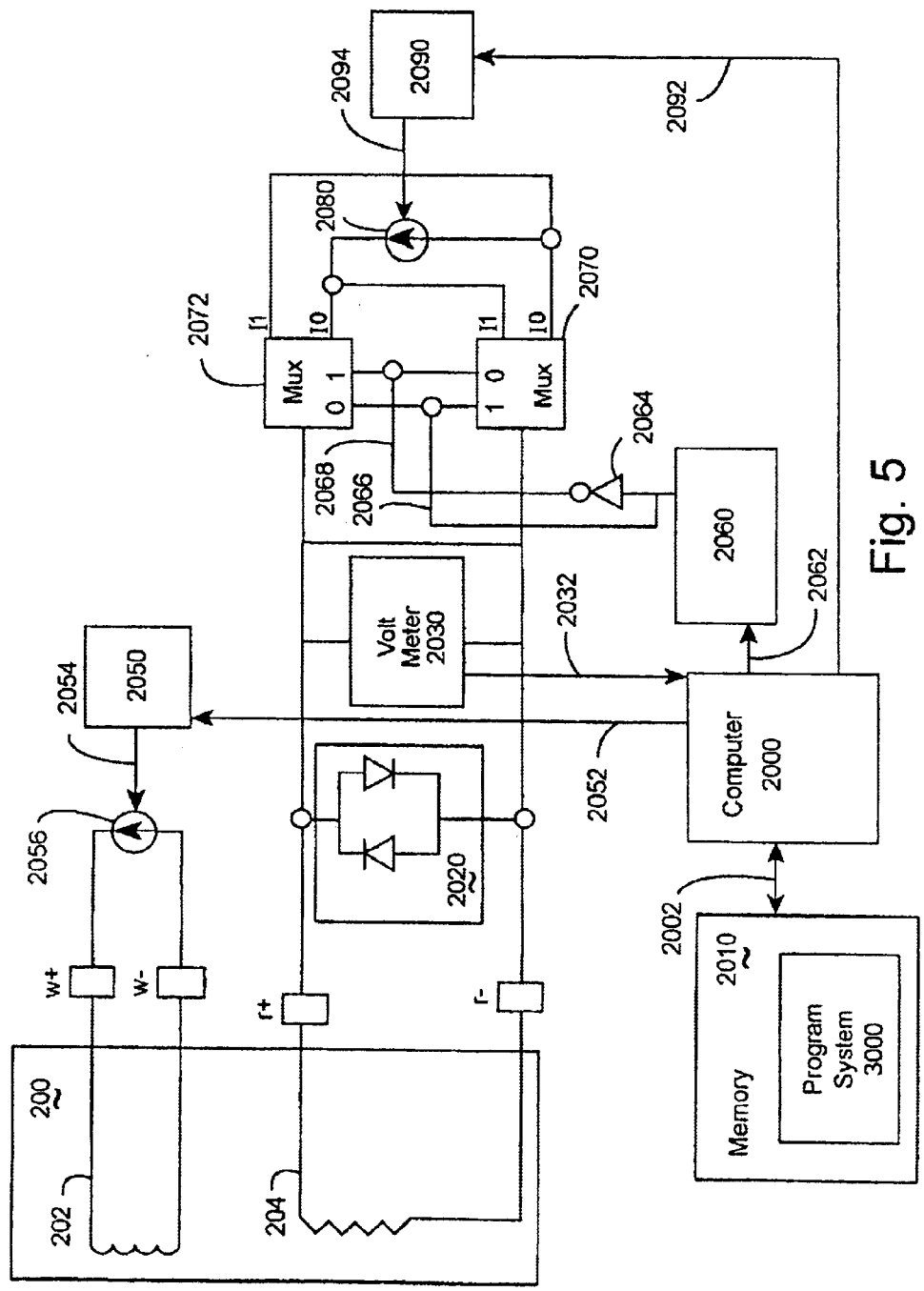
FIG. 5 illustrates a system capable of repairing the read head and is similar to an experimental system used to test the repair method.

FIG. 5 illustrates a system capable of repairing the read head and is similar to an experimental system used to test the repair method.

Write current source 2056 drives write differential signal pair w+ and w− of merged magnetoresistive read-write head 200 at a write current level controlling a magnetic field produced by write head 202 to induce a temperature rise in a read head 204.

Read current source 2080 drives a read differential signal pair of merged magnetoresistive read-write head 200 at a read current level to create a magnetic field within read head 204.

The write current level onto write differential signal pair w+ and w− and the read current level onto read differential signal pair r+ and r− are maintained for at least a time period.

ESD protection circuit 2020 couples across the read differential signal pair r+ and r− protecting merged magnetoresistive read-write head 200 from ESD. Note that it is preferable with today's technology to use a dual diode circuit as shown herein, but ESD protection may be provided by other approaches, which may include integration of ESD protection into volt meter 2030 and/or read current source 2080.

Computer 2000 may provide a means for controlling at least one of the current source collection including read current source 2080 and write current source 2056. Alternatively, a finite state machine and/or a neural network may provide control to one or more of the current source collection members.

The means for inducing the temperature rise by applying current to the write head, creating a magnetic field across the read head and/or maintaining these conditions for a period of time, may be performed at least in part by computer 2000, finite state machine and/or neural network.

These means implemented at least in part of computer 2000 may further be implemented as program steps of a program system 3000 residing in memory 2010 accessibly coupled 2002 with computer 2000.

Box 2050 receives information sent 2052 from the computer 2000. Box 2050 sends a signal 2054 to the write current source 2056.

The volt meter 2030 is coupled to ESD protection circuit 2020 and through mixes 2072 and 2070 to the read current source 2080.

The computer 2000 sends a signal 2092 to Box 2090. Box 2090 sends a signal 2094 to the read current source 2080.

Box 2060 is controlled 2062 by the computer 2000. A signal 2066 is sent from the box 2060 to the "0" input of Mux 2072 and the "1" input of Mux 2070. The signal 2066 is also sent to an inverter 2064 to generate a signal 2068. The signal 2068 is sent to the "1" input of Mux 2072 and to "0" input of Mux 2070. The write current source 2080 top terminal is presented to the "J1" input of the Mux 2070 and presented to the "I0" input of the Mux 2072. The write current source 2080 bottom terminal is presented to the "I1" input of the Mux 2072 and presented to the "I0" input of the Mux 2070.

The effect of the coupling of the write current source 2080 to the muxes 2070 and 2072 is to control which terminal is coupled to the read differential signal pair components r+ and r−. In one setting of signal 2066, the top terminal of 2080 couples with r+, and the bottom terminal of 2080 couples with r−. In a second of signal 2066, the top terminal of 2080 couples with r−, and the bottom terminal of 2080 couples with r+.

For reasons of clarity of discourse, the finite state machine and neural network implementations will not be discussed further. While it is preferred today to implement these means with computers, this discussion should not be construed as limiting the scope of the claims to computers.

Figure 6A:
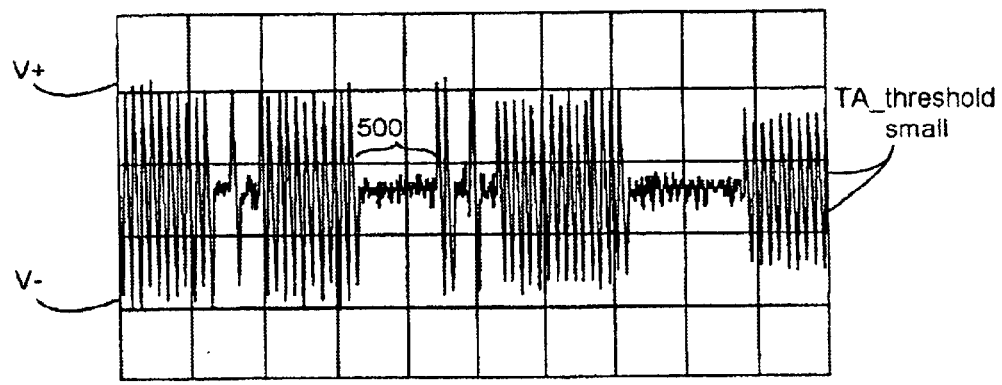
FIGS. 6A–6C illustrate laboratory results obtained showing the effect of unstable read-write heads causing base line popping in region 502 and the effect of repairs made with the invention removing base line popping in region 504.
Figure 6B:
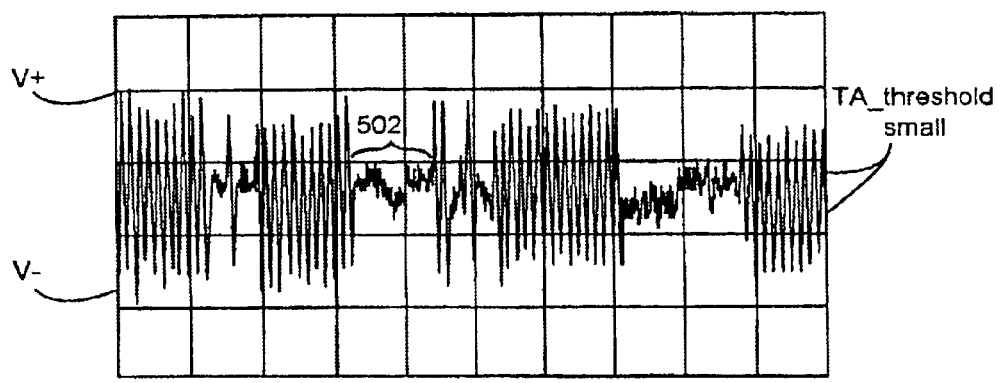
Figure 6C:
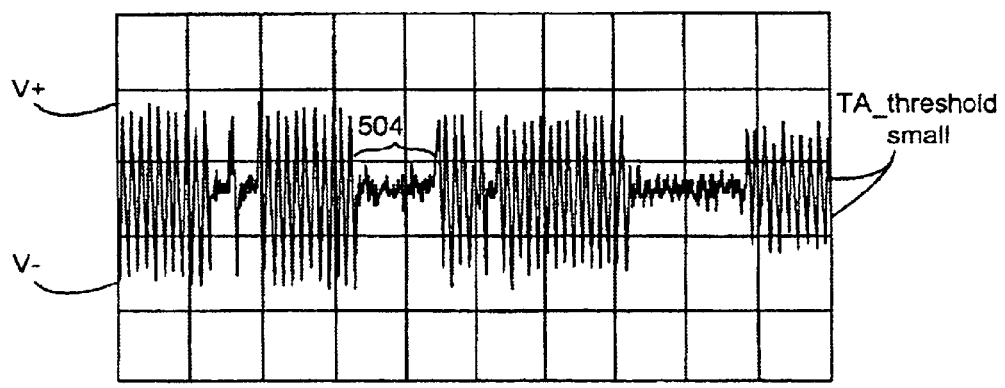

FIGS. 6A–6C illustrate laboratory results obtained showing the effect of unstable read-write heads causing base line popping in region 502 and the effect of repairs made with the invention removing base line popping in region 504.

Region 500 of FIG. 6A illustrates normal operation of a read head. Region 502 of FIG. 6B illustrates damaged operation of the read head after an unstable operation causes base line popping in that region. Region 504 of FIG. 6C illustrates operation of the previously unstable read head after repair. Note that the base line popping found in 502 is largely reduced in region 504, indicating the read head's magnetic domain is effectively repaired.

Figure 1A:
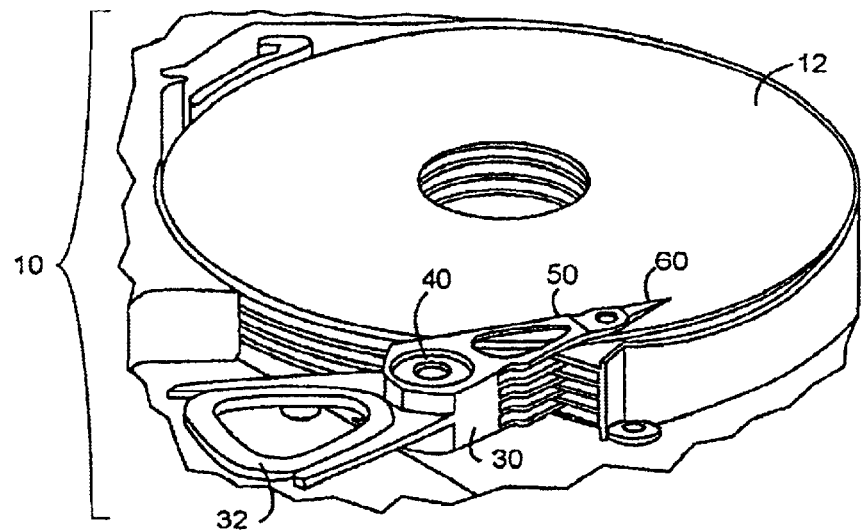
FIG. 1A illustrates a typical prior art high capacity disk drive 10 including actuator arm 30 with voice coil 32, actuator axis 40, suspension or head arm 50 with slider/head unit 60 placed among the disks.
Figure 1B:
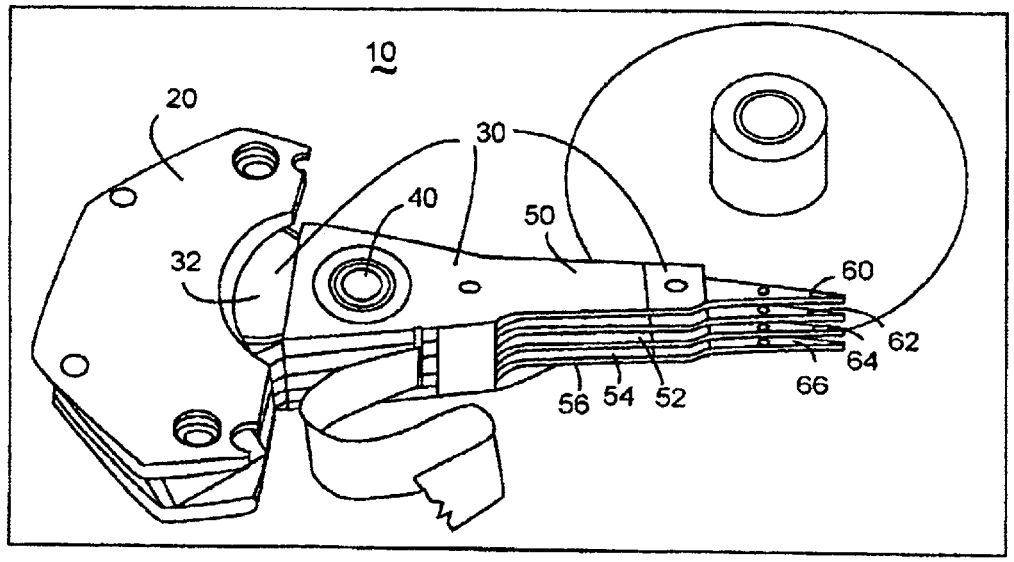
FIG. 1B illustrates a typical prior art high capacity disk drive 10 with actuator 20 including actuator arm 30 with voice coil 32, actuator axis 40, head arms 50–56 and slider/head units 60–66 with the disks removed.
Figure 2A:
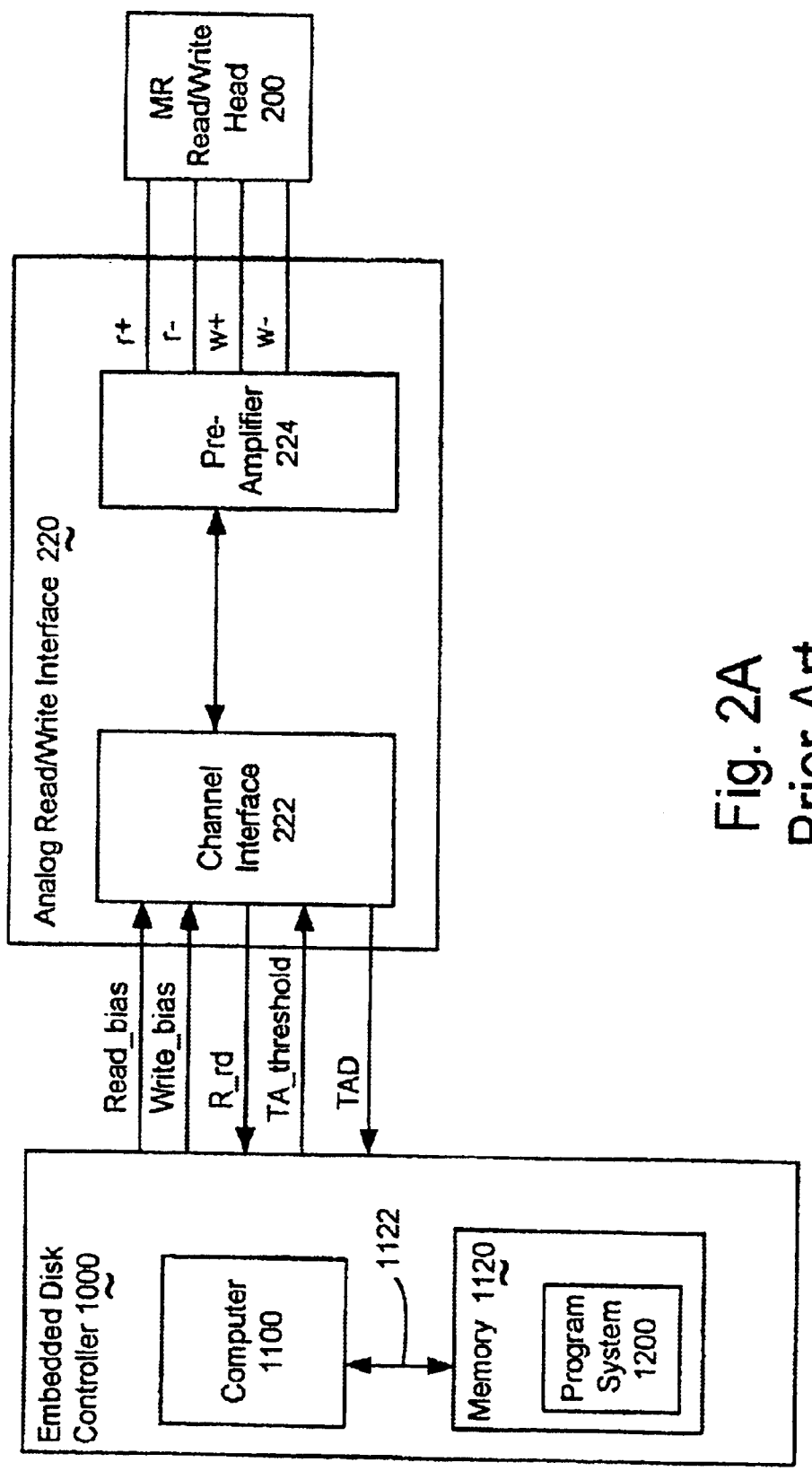
FIG. 2A illustrates a simplified schematic of a disk drive controller 1000 controlling an analog read/write interface 220, the read differential signal pair (r+ and r−) and write differential signal pair (w+ and w−) communicating the resistivity found in the spin valve within MR read/write head 200 of the prior art.
Figure 2B:
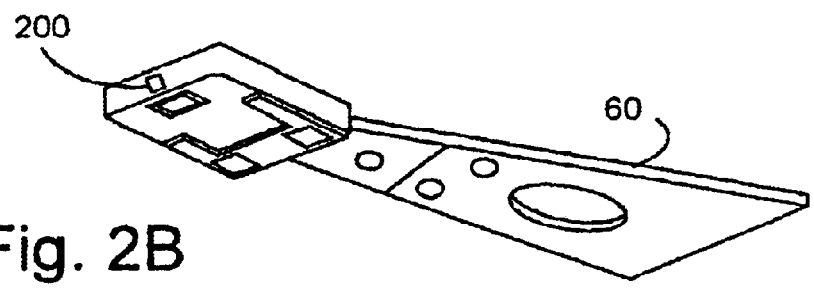
FIG. 2B illustrates a suspended head slider 60 containing the MR read-write head 200 of the prior art.
Figure 2C:
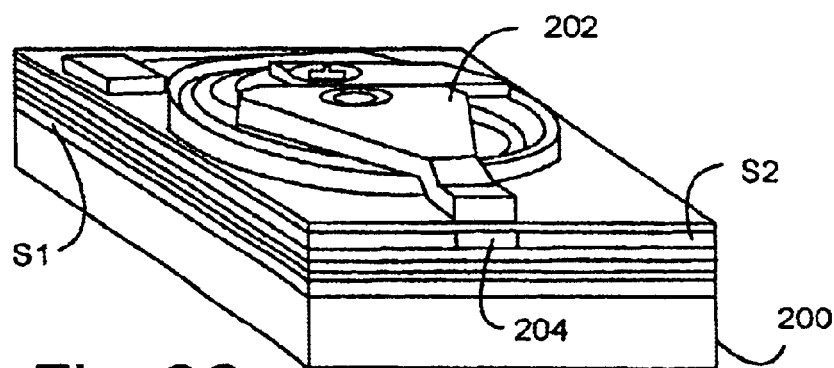
FIG. 2C illustrates a perspective view of merged read-write head 200 from FIG. 2B including write inductive head 202 and magnetoresistive read head (or spin valve) 204 of the prior art.
Figure 2D:
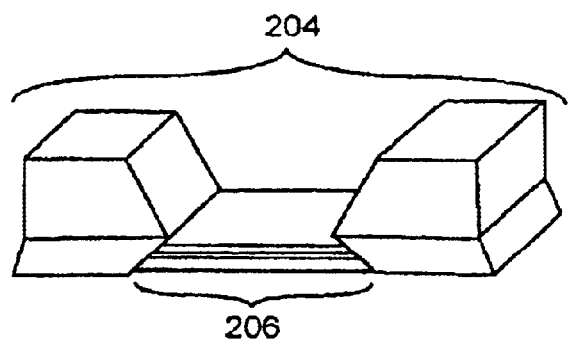
FIG. 2D illustrates a simplified cross section view of spin valve 204 of FIG. 2C of the prior art.
Figure 2E:
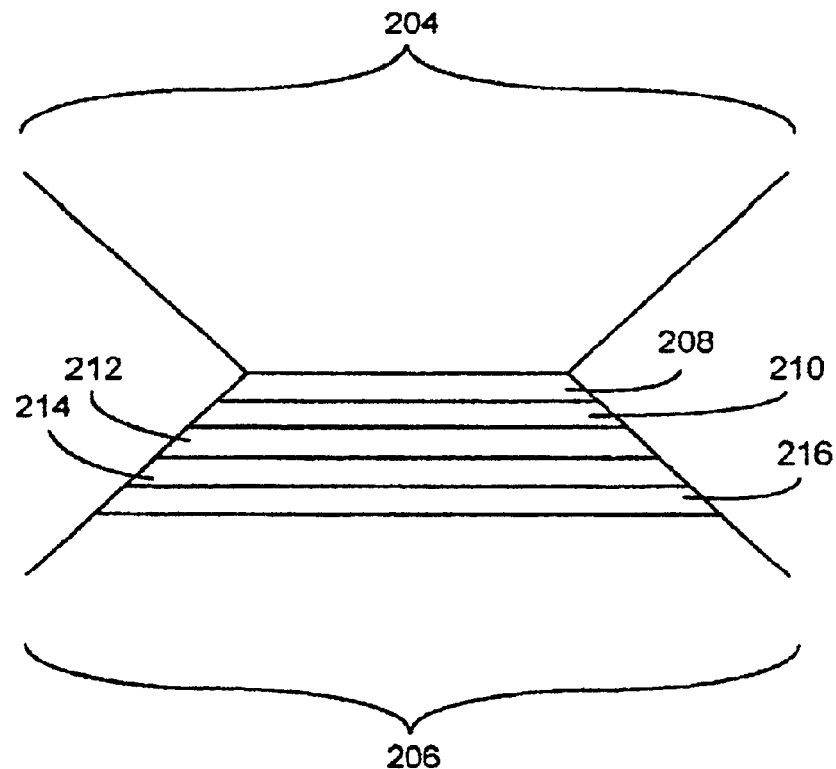
FIG. 2E illustrates a more detailed cross section view of region 206 of FIG. 2D, a typical GMR spin valve of the prior art.
Figure 2F:
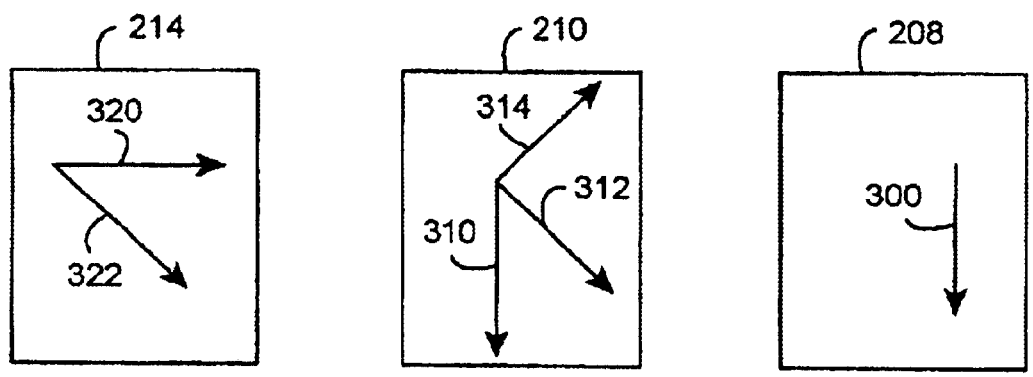
FIG. 2F illustrates normal magnetization of a spin valve read head as well as magnetization damage from ESD events as known in the prior art.
Figure 2G:
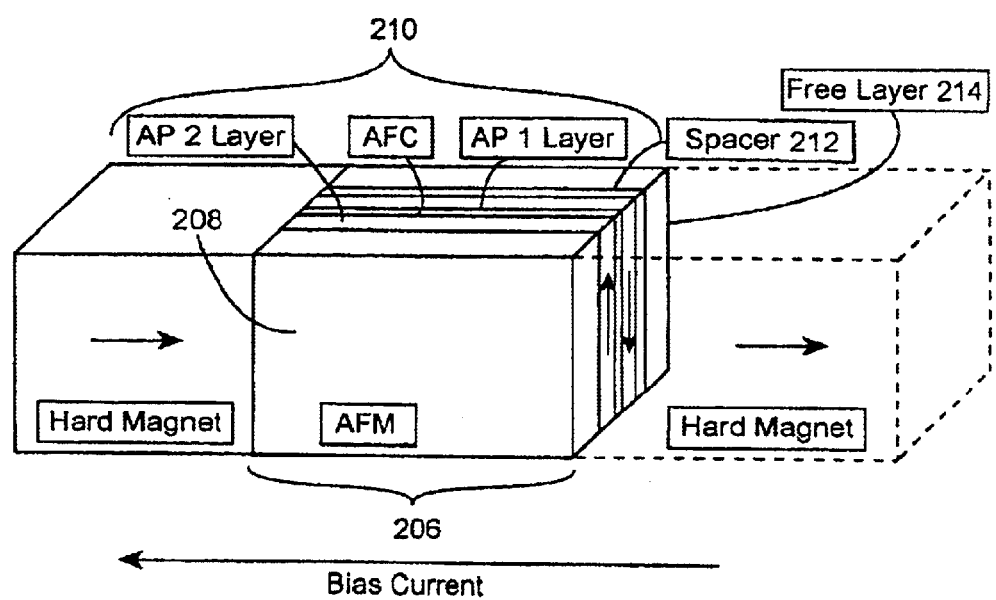
FIG. 2G illustrates an even more detailed cross section view of region 206 of FIGS. 2D and 2E, a typical GMR spin valve of the prior art.
Figure 3A:
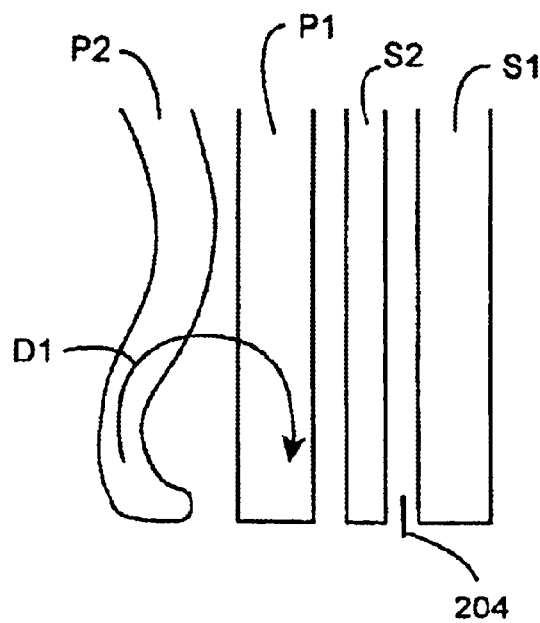
FIGS. 3A and 3B illustrate the magnetic flux direction related to the charging of the write differential signal pair connecting to P1 and P2 of the prior art.
Figure 3B:
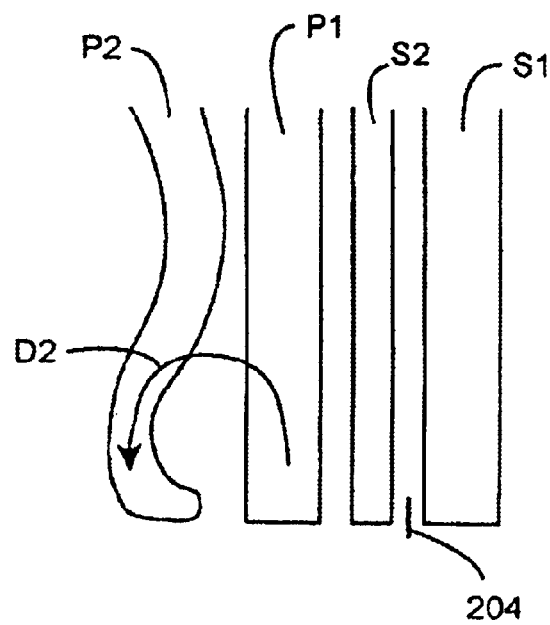
Figure 3C:
FIG. 3C illustrates a weak hard magnetic field due to edge domain problems based upon FIG. 2G leading to the phenomena of FIG. 3D as found in the prior art.
Figure 3D:
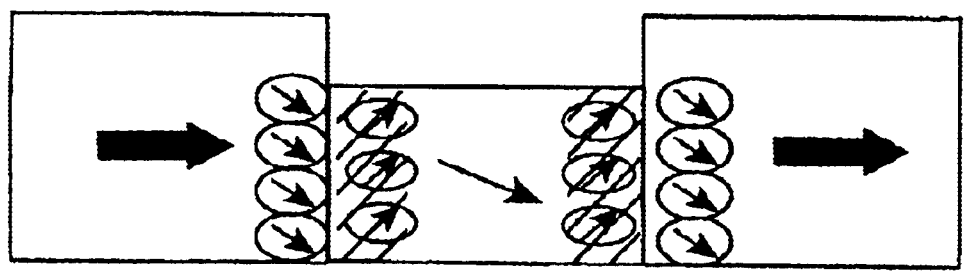
FIG. 3D illustrates the mechanism causing base line popping due to unstable edge domain rotation as found in the prior art.
Figure 4A:
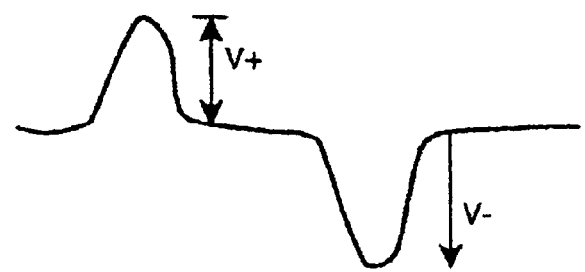
FIG. 4A depicts the voltage amplitude measured across the read differential signal pair sensing a written pulse on a disk drive surface in the prior art.
Figure 4B:
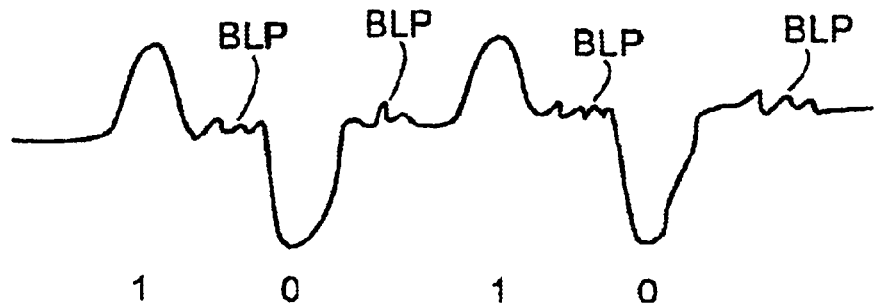
FIG. 4B illustrates base line popping, a condition often adversely affecting the quality of a spin valve and resulting from certain ESD discharge events as known in the prior art.
Figure 4C:
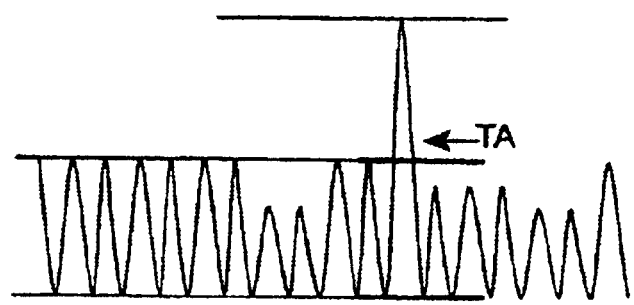
FIG. 4C illustrates a thermal asperity event as found in the prior art, causing another kind of distortion to the desired waveform shown in FIG. 4A.

FIGS. 6D–6G illustrate laboratory results obtained from an assembled disk drive showing the reading of a zeroed track, the TAD signal transitioning based upon the presence of base line popping noise, due to TA_threshold of FIG. 2A being set small.

Figure 6D:
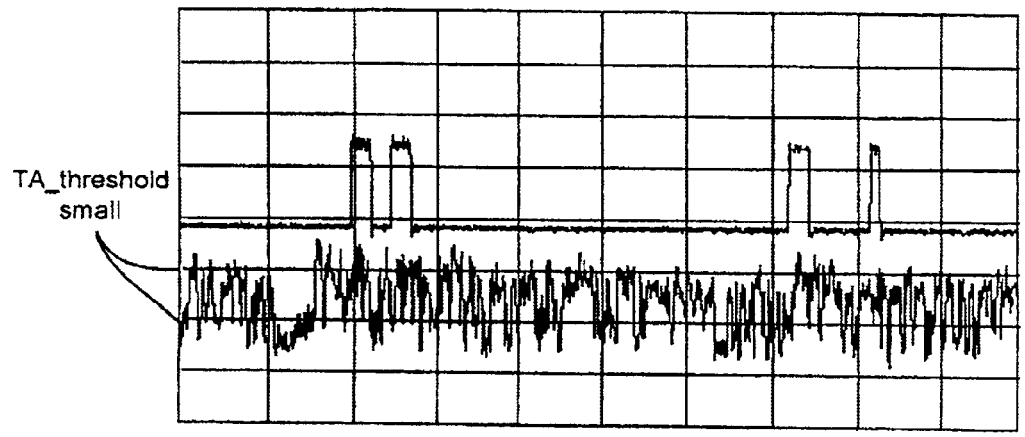
FIGS. 6D–6G illustrate laboratory results obtained from an assembled disk drive showing the reading of a zeroed track, the TAD signal transitioning based upon the presence of base line popping noise, due to TA_threshold of FIG. 2A being set small.

FIG. 6D illustrates TAD events in the top trace in the presence of base line popping noise shown in the bottom trace as read on the zeroed track.

Figure 6E:
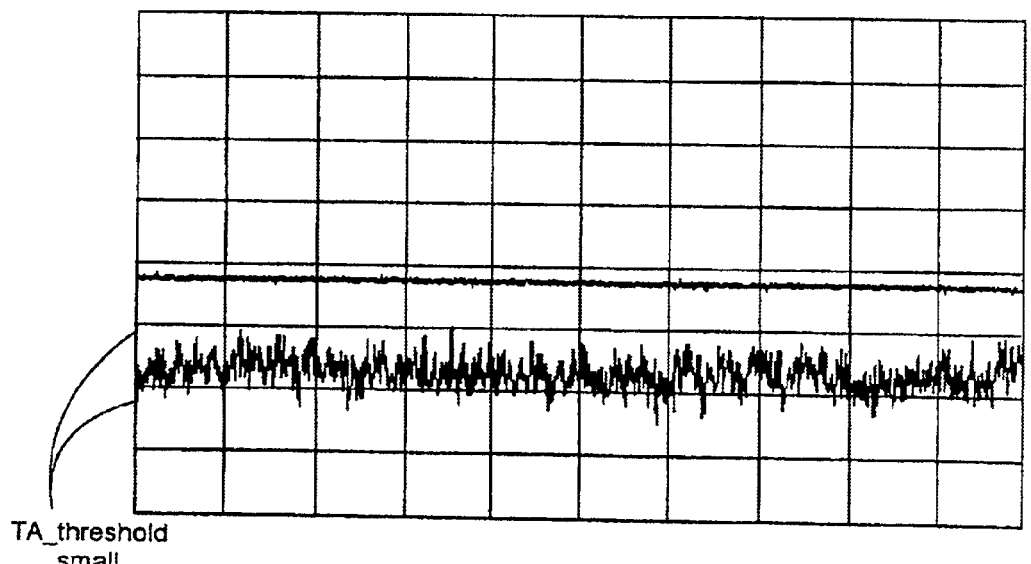

FIG. 6E illustrates no TAD events in the top trace when there is no base line popping noise in the bottom trace as read on the zeroed track.

Figure 6F:
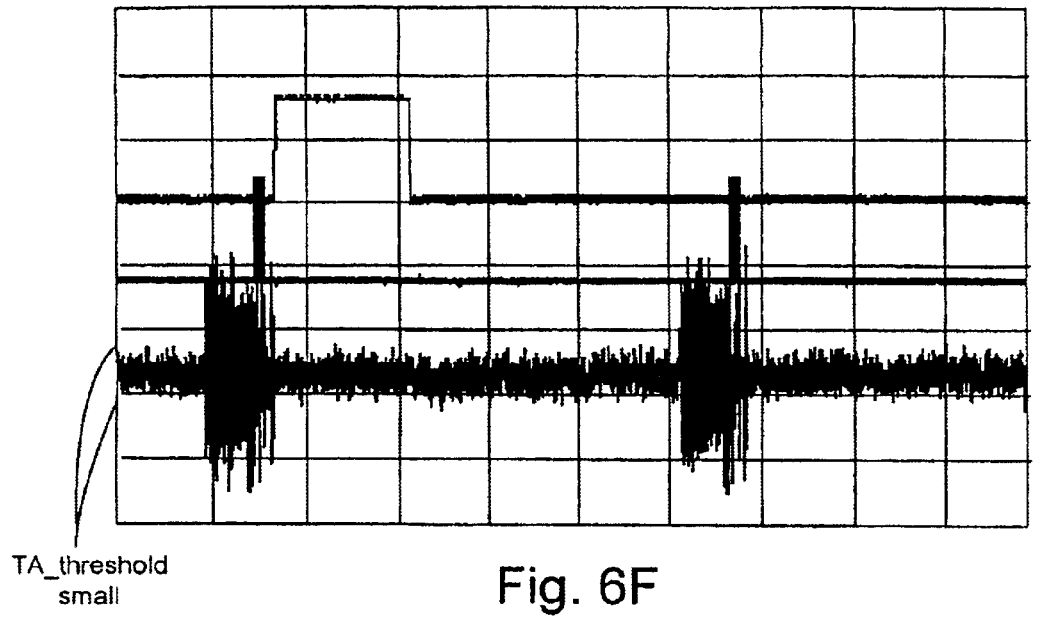

FIG. 6F illustrates laboratory results from reading a zeroed track with no base line popping noise. The top trace indicates track data when high. The middle trace indicates TAD events when high, which does not occur while track data is being read, indicating that the read signal in the bottom trace does not exhibit base line popping when reading track data.

Figure 6G:
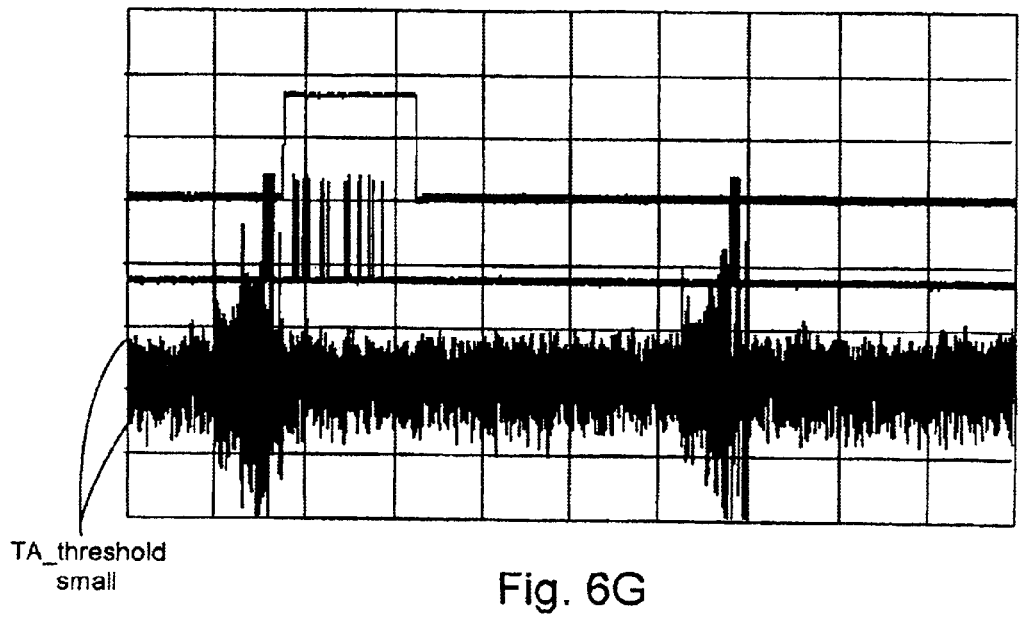

FIG. 6G illustrates laboratory results from reading a zeroed track with base line popping noise. The top trace indicates track data when high. The middle trace indicates TAD events when high, which does occur while track data is being read, indicating that the read signal in the bottom trace exhibits base line popping when reading track data.

Figure 7A:
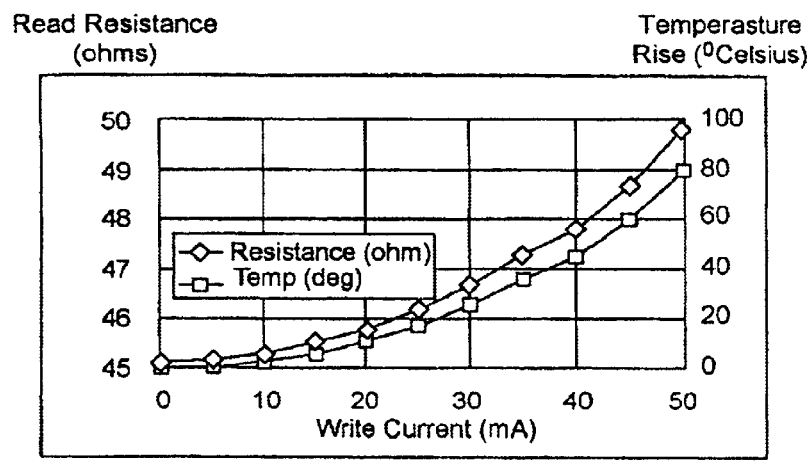
FIG. 7A illustrates the effect on resistance and temperature of a GMR read head (spin valve) with respect to the write current applied to the GMR write head.

FIG. 7A illustrates the effect on resistance and temperature of a GMR read head (spin valve) with respect to the write current applied to the GMR write head.

The bottom axis indicates the write current in milli-amps (mA). The left axis indicates read resistance in ohms. The right axis indicates temperature rise at the read head induced by the write current applied to the write head via the write differential signal pair. The temperature rise is indicated in degrees Celsius.

Note that the blocking temperature is between 200 to 300 degrees Celsius.

The diamond point path illustrates read-head resistance in terms of write current applied to the write head. The box point path illustrates the read head temperature rise induced by applying the write current level to the write head. Preferably the read head temperature is raised by about 100 degrees Celsius and the read current contributes another 100 to 150 degrees Celsius to pass the blocking temperature.

Figure 7B:
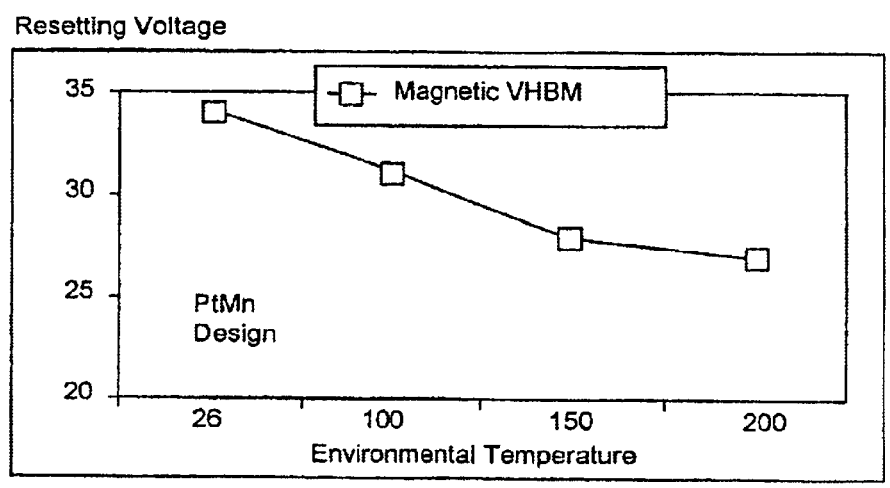
FIG. 7B illustrates that the resetting voltage based upon the Human Body Model decreases as the environmental temperature increases.

FIG. 7B illustrates that the resetting voltage based upon the Human Body Model decreases as the environmental temperature increases.

It should be noted that certain ESD events can at least partially reverse magnetization damage of the pinned layer. Such a reversal to shown horizontally as temperature in degrees Celsius and magnetic reversal voltage in the Human Body Model (VHBM) shown along the vertical axis.

Figure 8A:
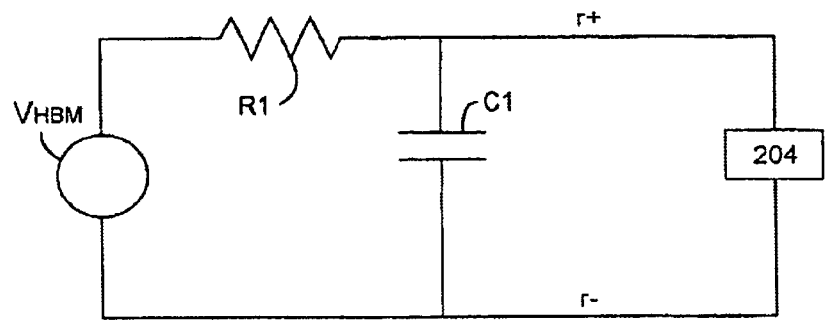
FIG. 8A illustrates the voltage model used in experimental determination of FIG. 7B.

FIG. 8A illustrates the voltage model used in experimental determination of FIG. 7B.

VHBM is generated by a voltage source, R1 is an approximately 1.5 k ohm resistor and C1 is an approximately 100 pico-Farad capacitor.

One skilled in the art will recognize that FIG. 8A is greatly simplified, leaving silent ESD protection among other things. FIG. 8A has been included to show how the Human Body Model (HBM) voltage VHBM is experimentally used.

In the following figures are flowcharts of at least one method of the invention possessing arrows with reference numbers. These arrows signify flow of control and sometimes data supporting implementations in any combination of the following. At least one program or program thread executing upon a computer. Hyperlinks. Inferential links in an inferential engine. A state transition in a finite state machine. And as a dominant learned response within a neural network.

Figure 8B:
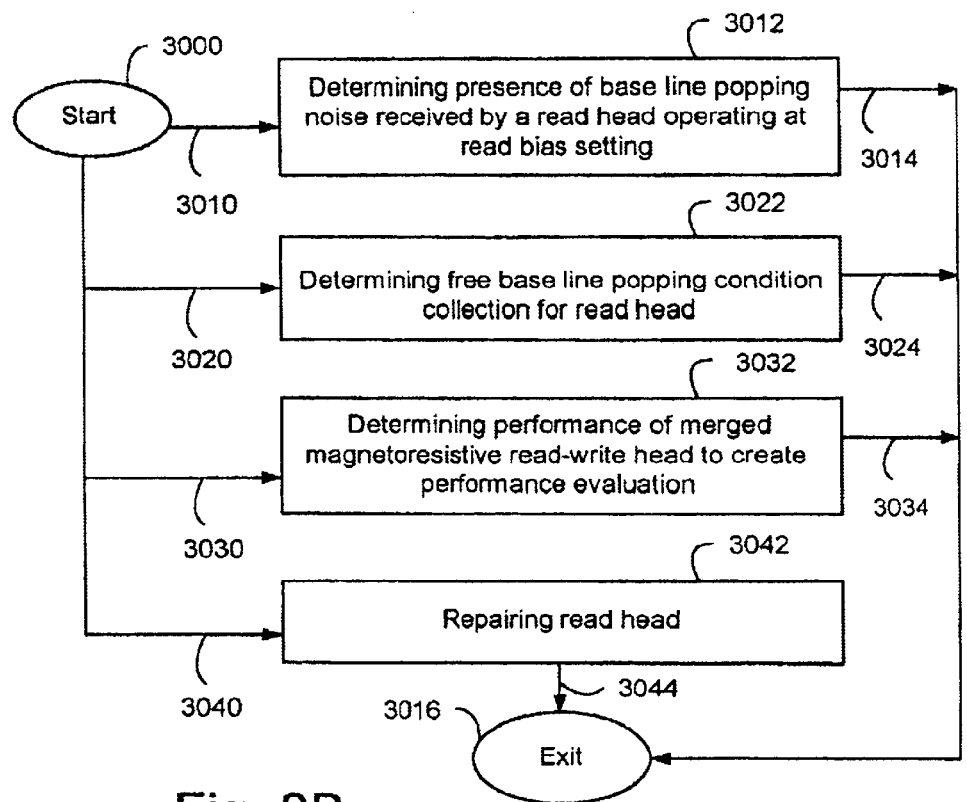
FIG. 8B illustrates the operation 3000 of FIG. 2A implementing the methods of this invention within a disk drive.
Figure 9A:
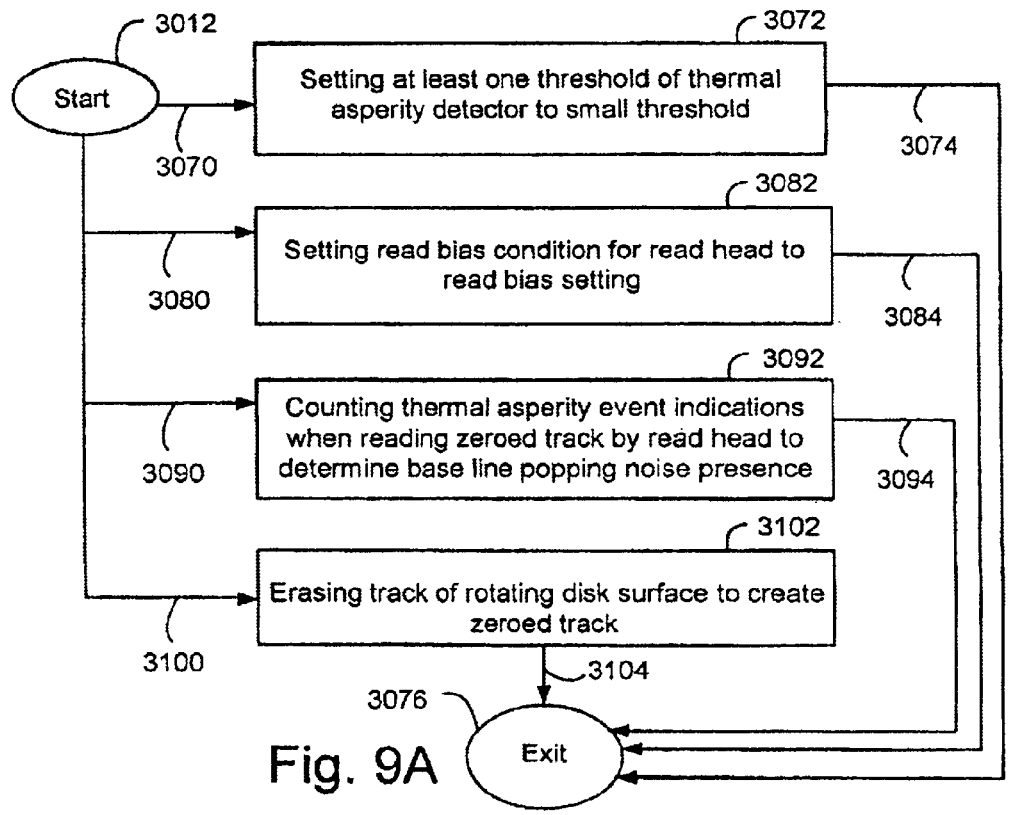
FIG. 9A illustrates a detail flowchart of operation 3012 of FIG. 8B further determining the presence of base line popping noise received by a read head operating at a read bias setting.
Figure 9B:
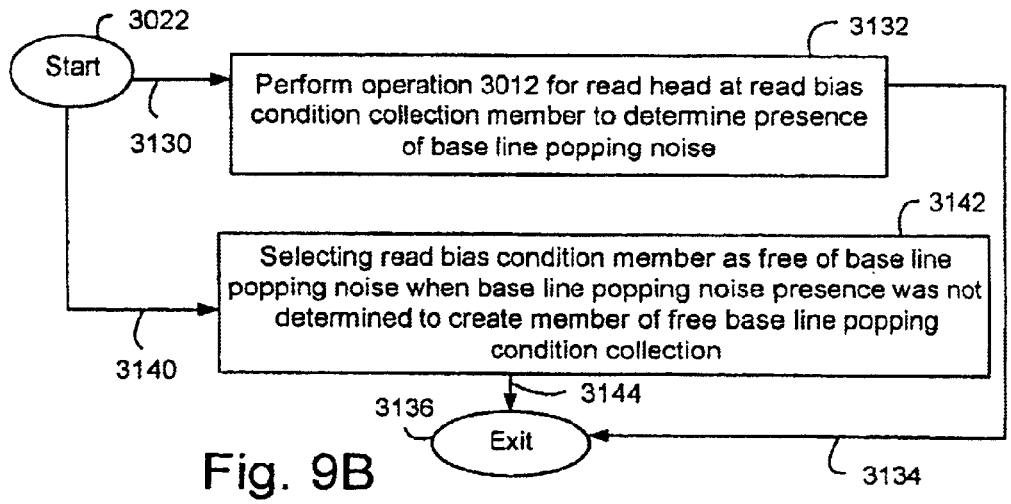
FIG. 9B illustrates a detail flowchart of operation 3022 of FIG. 8B further performing determining a free base line popping condition collection for members of a read bias condition collection containing at least two of the read bias conditions, comprising the included operations for each member of the read bias condition collection.
Figure 10A:
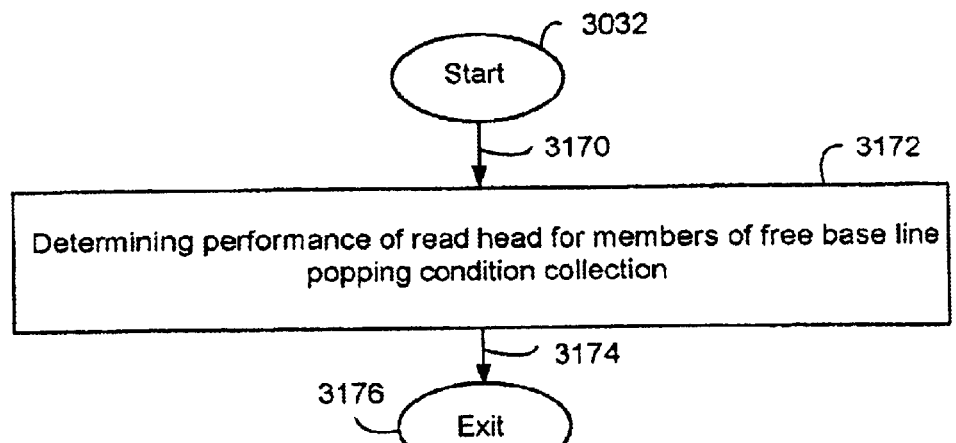
FIG. 10A illustrates a detail flowchart of operation 3032 of FIG. 8B further determining performance of the merged magnetoresistive read-write head to create a performance evaluation.
Figure 10B:
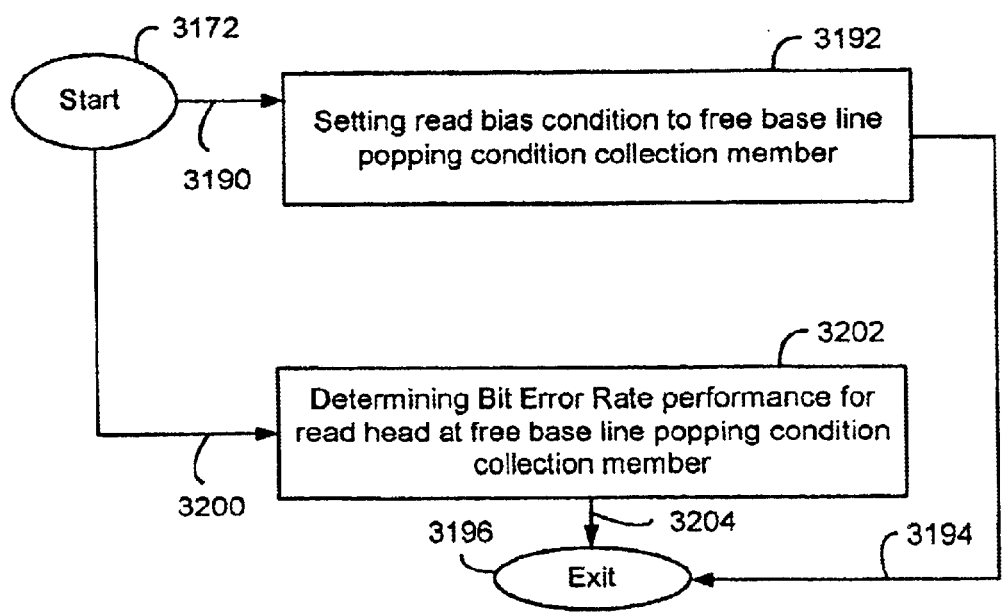
FIG. 10B illustrates a detail flowchart of operation 3172 of FIG. 10A further determining performance, for each of the free base line popping condition collection members.
Figure 11A:
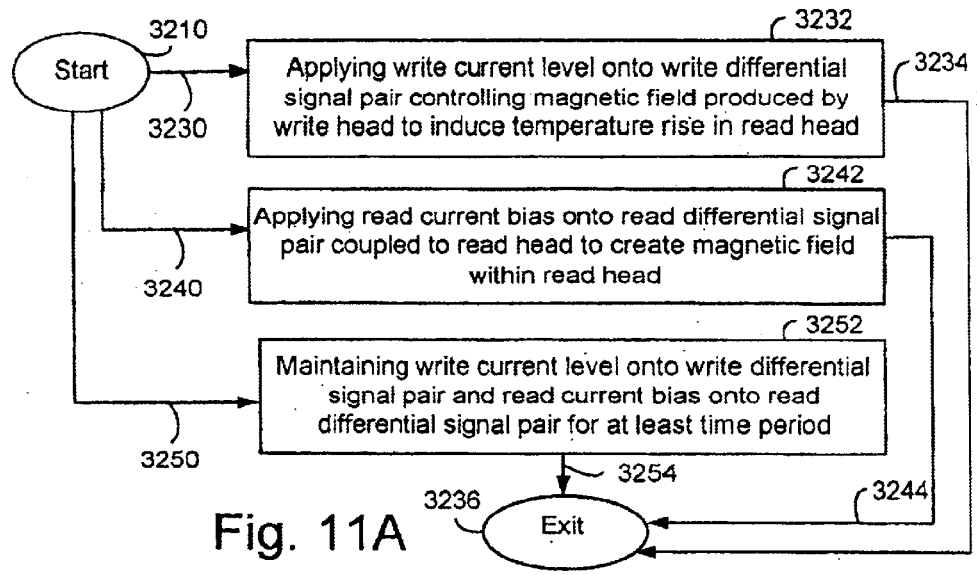
FIG. 11A illustrates a detail flowchart of operation 3042 of FIG. 8B further repairing the read head, including the following repair step collection.
Figure 11B:
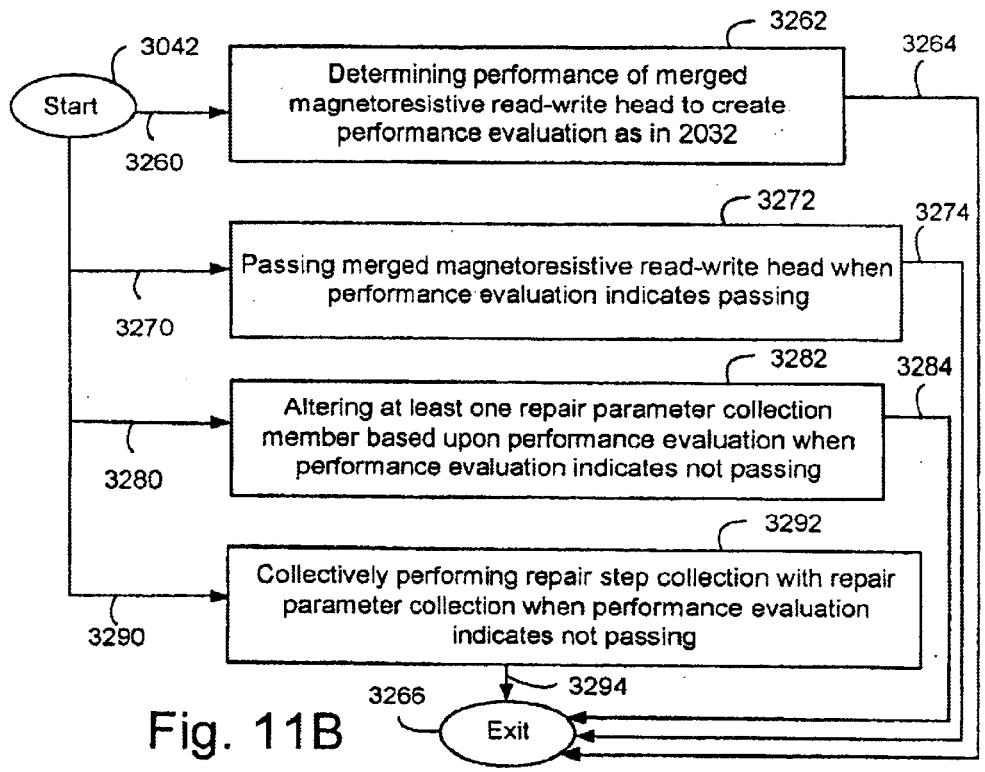
FIG. 11B illustrates a further detail flowchart of operation 3042 of FIG. 8B further repairing the merged magnetoresistive read-write head.
Figure 12A:
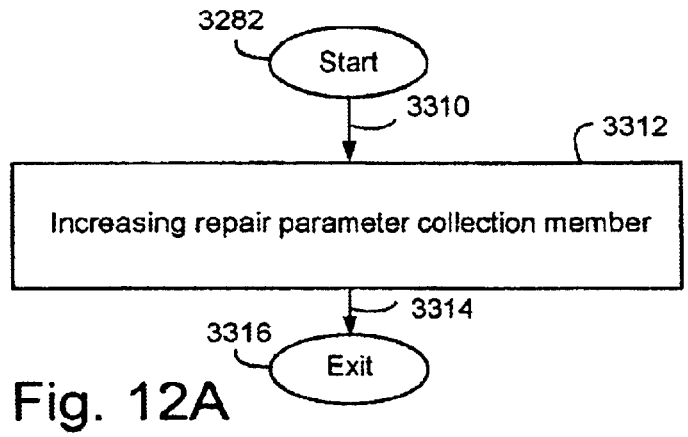
FIG. 12A illustrates a detail flowchart of operation 3282 of FIG. 11B further altering the repair parameter collection member.
Figure 12B:
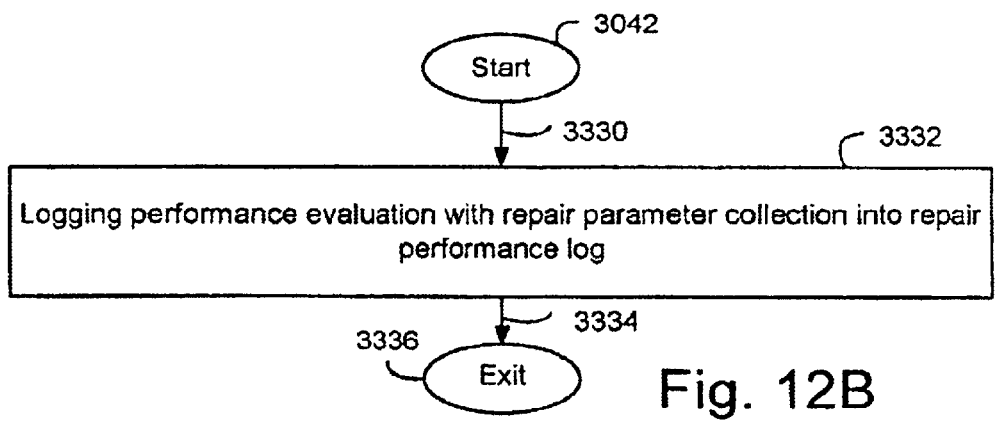
FIG. 12B illustrates a detail flowchart of operation 3042 of FIG. 8B further repairing the read head.
Figure 12C:
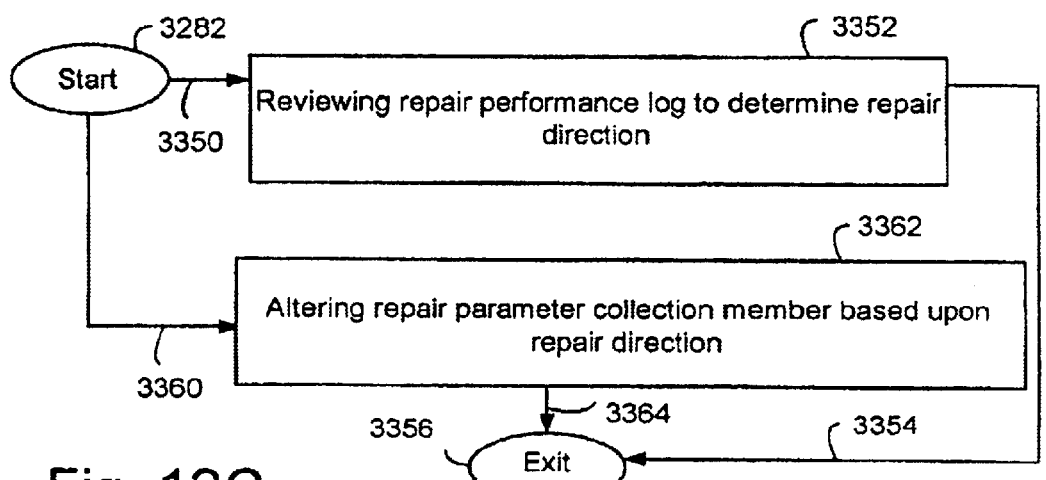
FIG. 12C illustrates a detail flowchart of operation 3282 of FIG. 11B further altering the repair parameter collection member.

In FIG. 8B, the arrows include 3010, 3014, 3020 3024, 3030, 3034, 3040, and 3044. In FIG. 9A, the arrows include 3070, 3074, 3080, 3084, 3090, 3094, 3100, and 3104. In FIG. 9B, the arrows include 3130, 3134, 3140, and 3144. In FIG. 10A, the arrows include 3170 and 3174. In FIG. 10B, the arrows include 3190, 3194, 3200, and 3204. In FIG. 11A, the arrows include 3230, 3234, 3240, 3244, 3250, and 3254. In FIG. 11B, the arrows include 3260, 3264, 3270, 3274, 3280, 3284, 3290, and 3294. In FIG. 12A, the arrows include 3310 and 3314. In FIG. 12B, the arrows include 3330 and 3334. In FIG. 12C, the arrows include, 3350, 3354, 3360, and 3364.

The operation of starting a flowchart refers to at least one of the following. Entering a subroutine in a macro instruction sequence executed by a computer. Entering into a deeper node of an inferential graph. Directing a state transition in a finite state machine, possibly while pushing a return state. And triggering a collection of neurons in a neural network.

The operation of termination in a flowchart refers to the completion of those operations, which may result in one or more of the following. A subroutine return, traversal of a higher node in an inferential graph, popping of a previously stored state in a finite state machine, return to dormancy of the firing neurons of the neural network.

Terminations in the following flowcharts includes 3016 in FIG. 8B, 3076 in FIG. 9A, 3136 in FIG. 9B, 3176 in FIG. 10A, 3196 in FIG. 10B, 3236 in FIG. 11A, 3294 in FIG. 11B, 3316 in FIG. 12A, 3336 in FIG. 12B, and 3356 in FIG. 12C.

A computer as used herein will include, but is not limited to, an instruction processor; wherein the instruction processor includes at least one instruction processing element and at least one data processing element, each data processing element controlled by at least one instruction processing element.

FIG. 8B illustrates the operation 3000 of FIG. 2A implementing the methods of this invention within a disk drive.

Operation 3012 performs a method determining the presence of base line popping noise received by a read head operating at a read bias setting and accessing a rotating disk surface. Operation 3022 performs determining a free base line popping condition collection for a read head within a disk drive free of base line popping noise for members of a read bias condition collection containing at least two of the read bias conditions. Operation 3032 performs determining performance of the merged magnetoresistive read-write head to create a performance evaluation. Operation 3042 performs repairing the read head.

In FIG. 8B, the arrows include 3011, 3014, 3020, 3024, 3030, 3034, 3040, and 3044, 3016 represents flowchart termination in FIG. 8B.

FIG. 9A illustrates a detail flowchart of operation 3012 of FIG. 8B further determining the presence of base line popping noise received by a read head operating at a read bias setting.

Operation 3072 performs setting at least one threshold of a thermal asperity detector to a small threshold providing a thermal asperity event indication; wherein the read head is communicatively coupled with the thermal asperity detector.

Operation 3082 performs setting a read bias condition for the read head to the read bias setting. Operation 3092 performs counting the thermal asperity event indications when reading a zeroed track by the read head to determine the base line popping noise presence for the read head accessing the rotating disk surface at the read bias setting.

Note that operation 3092 is preferably performed with a fixed gain within a predetermined range.

The method of operation 3012 of FIG. 8B may further include the following. Operation 3102 erasing a track of the rotating disk surface to create the zeroed track.

The read bias condition may be either a read bias current or a read bias voltage.

In FIG. 9A, the arrows include 3070, 3074, 3080, 3084, 3090, 3094, 3100, and 3104, 3076 represents flowchart termination in FIG. 9A.

FIG. 9B illustrates a detail flowchart of operation 3022 of FIG. 8B further performing determining a free base line popping condition collection for members of a read bias condition collection containing at least two of the read bias conditions, comprising the included operations for each member of the read bias condition collection.

Operation 3132 performs operation 3012 for the read head at the read bias condition collection member to determine the presence of base line popping noise. Operation 3142 performs selecting the read bias condition member as free of base line popping noise when the base line popping noise presence was not determined to create a member of the free base line popping condition collection.

In FIG. 9B, the arrows include 3130, 3134, 3140, and 3144, 3136 represents flowchart termination in FIG. 9B.

The read bias condition collection may preferably contain a least bias condition and successive increments of that least bias condition to a maximum bias condition. In the experiments performed and in this document, the discussion is focused on a read bias current with a read bias condition collection containing 2.0 mA, 2.5 mA, . . . 5.0 mA and 5.5 mA. While this is preferred for certain disk drives, and is the actual laboratory results being reported, it is not meant to limit the scope of the claims.

The same physics and systems results may be derived using read bias voltages. Similarly, it is a convenience to use incremental values for the read bias condition members. The invention would work and is claimed without any regard for whether the read bias condition members are successive increments of each other.

The reading of the zeroed track is often preferably done within the context of setting a TAD bandwidth to limit background noise.

By way of example, the following table illustrates TAD event counts for reading a zeroed track with TA_threshold set small.

| RC(mA) | Head 0 | Head 1 | Head 2 | Head 3 |
|---|---|---|---|---|
| 2.0 | 0 | 9 | 0 | 0 |
| 2.5 | 0 | 9 | 0 | 0 |
| 3.0 | 0 | 6 | 4 | 0 |
| 3.5 | 0 | 0 | 3 | 0 |
| 4.0 | 0 | 0 | 5 | 0 |
| 4.5 | 0 | 0 | 4 | 5 |
| 5.0 | 0 | 0 | 0 | 8 |
| 5.5 | 0 | 0 | 0 | 7 |

Table One illustrates an example of performing operation 3012 for the read head at the read bias condition collection members to determine the presence of base line popping noise. The presence of base line popping noise is indicated when the TAD event count is greater than zero.

In this example, Head 0 has no base line popping noise for any of the read bias condition members. Head 1 has base line popping noise from 2.0 mA to 3.0 mA. Head 2 has base line popping noise between 3.0 mA and 4.5 mA. Head 3 has base line popping between 4.5 mA and 5.5 mA.

FIG. 10A illustrates a detail flowchart of operation 3032 of FIG. 8B further determining performance of the merged magnetoresistive read-write head to create a performance evaluation.

Operation 3172 performs determining performance of the read head for the members of the free base line popping condition collection.

In FIG. 10A, the arrows include 3170 and 3174, 3176 represents flowchart termination in FIG. 10A.

FIG. 10B illustrates a detail flowchart of operation 3172 of FIG. 10A further determining performance, for each of the free base line popping condition collection members.

Operation 3192 performs setting the read bias condition to the free base line popping condition collection member. Operation 3202 performs determining a Adaptive Read Channel Optimization for the read head at the free base line popping condition collection member.

In FIG. 10B, the arrows include 3190, 3194, 3200, and 3204, 3196 represents flowchart termination in FIG. 10B.

Adaptive Read Channel Optimization may include use of Bit Error Rate performance measure. Adaptive Read Channel Optimization may preferably treat the free base line popping condition collection as a look up table, which may further be coded in terms of ranges of bias conditions free of base line popping noise for a given read head.

FIG. 11A illustrates a detail flowchart of operation 3042 of FIG. 8B further repairing the read head, including the following repair step collection.

Operation 3232 performs applying a write current level onto a write differential signal pair controlling a magnetic field produced by a write head to induce a temperature rise in a read head. Operation 3242 performs applying a read current bias onto a read differential signal pair coupled to the read head to create a magnetic field within the read head. Operation 3252 performs maintaining the write current level onto the write differential signal pair and the read current bias onto the read differential signal pair for at least a time period.

In FIG. 11A, the arrows include 3230, 3234, 3240, 3244, 3250, and 3254, 3236 represents flowchart termination in FIG. 11A.

FIG. 11B illustrates a further detail flowchart of operation 3042 of FIG. 8B further repairing the merged magnetoresistive read-write head.

Operation 3264 performs determining performance of the merged magnetoresistive read-write head to create a performance evaluation as in operation 3032 of FIG. 8B. Operation 3272 performs passing the merged magnetoresistive read-write head when the performance evaluation indicates passing. Operation 3282 performs altering at least one member of a repair parameter collection based upon the performance evaluation when the performance evaluation indicates not passing. Operation 3292 performs collectively performing the repair step collection with the repair parameter collection when the performance evaluation indicates not passing.

The repair parameter collection includes the write current level, the read current level, and the time period.

FIG. 11B, the arrows include 3260, 3264, 3270, 3274, 3280, 3284, 3290, and 3294, 3294 represents flowchart termination in FIG. 11B.

FIG. 12A illustrates a detail flowchart of operation 3282 of FIG. 11B further altering the repair parameter collection member.

Operation 3312 performs increasing the repair parameter collection member.

In FIG. 12A, the arrows include 3310 and 3314, 3316 represents flowchart termination in FIG. 12A.

FIG. 12B illustrates a detail flowchart of operation 3042 of FIG. 8B further repairing the read head.

Operation 3332 performs logging the performance evaluation with the repair parameter collection into a repair performance log.

In FIG. 12B, the arrows include 3330 and 3334, 3336 represents flowchart termination in FIG. 12B.

FIG. 12C illustrates a detail flowchart of operation 3282 of FIG. 11B further altering the repair parameter collection member.

Operation 3352 performs reviewing the repair performance log to determine a repair direction. Operation 3362 performs altering the repair parameter collection member based upon the repair direction.

In FIG. 12C, the arrows include, 3350, 3354, 3360, and 3364, 3356 represents flowchart termination in FIG. 12C.

Note that detecting when the merged magnetoresistive read-write head contains a damaged pinned layer may be achieved by determining whether the free base line popping condition collection is empty. Repair may be effected when a damaged pinned layer is determined.

Note that performance logs may be built with the performance evaluations and that an alteration direction may be determined from the performance log to guide altering the repair parameter collection members.

The preceding embodiments have been provided by way of example and are not meant to constrain the scope of the following claims.

What is claimed is:

1. A disk drive apparatus for determining the presence of base line popping noise received by a read head operating at a read bias setting and accessing a rotating disk surface contained in said disk drive, comprising:
   means for setting at least one threshold of a thermal asperity detector to a small Thermal Asperity threshold (TA threshold) providing a thermal asperity event indication; wherein said read head is communicatively coupled with said thermal asperity detector;
   means for setting a read bias condition for said read head to said read bias setting; and
   means for counting said thermal asperity event indications when reading a zeroed track by said read head to determine said base line popping noise presence for said read head accessing said rotating disk source at said read bias setting.

2. The apparatus of claim 1,
   wherein said read bias condition is a member of a read bias condition collection comprising a read bias current and a read bias voltage.

3. The apparatus of claim 1, further comprising:
   means for erasing a track of said rotating disk surface to create said zeroed track.

4. The apparatus of claim 1 determining a free base line popping condition collection for a read head within a disk drive free of base line popping noise for members of a read bias condition collection containing at least two of said read bias conditions, comprising for each member of said read bias condition collection:
   means for performing the method of claim 1 for said read head at said read bias condition collection member to determine said presence of base line popping noise; and
   means for selecting said read bias condition member as free of base line popping noise when said base line popping noise presence was not determined to create a member of said free base line popping condition collection.

5. The apparatus of claim 4 determining performance of said merged magnetoresistive read-write head to create a performance evaluation, comprising:
   means for determining performance of said read head for said members of said free base line popping condition collection.

6. The apparatus of claim 5,
   wherein the means for determining performance is further comprised, for each of said free base line popping condition collection members, of:
   means for setting said read bias condition to said free base line popping condition collection member; and
   means for performing an Adaptive Read Channel Optimization for said read head at said free base line popping condition collection member.

7. The apparatus of claim 6 repairing said read head, comprising a repair step collection including:
   means for applying a write current level onto a write differential signal pair controlling a magnetic field produced by a write head to induce a temperature rise in a read head;
   means for applying a read current bias onto a read differential signal pair coupled to said read head to create a magnetic field within said read head; and
   means for maintaining said write current level onto said write differential signal pair and said read current bias onto said read differential signal pair for at least a time period.

8. The apparatus of claim 7, further comprising:
   means for determining performance of said merged magnetoresistive read-write head to create a performance evaluation;
   means for passing said merged magnetoresistive read-write head when said performance evaluation indicates passing;
   means for altering at least one member of a repair parameter collection based upon said performance evaluation when said performance evaluation indicates not passing;
   means for collectively performing the repair step collection with said repair parameter collection when said performance evaluation indicates not passing;
   wherein said repair parameter collection is comprised of said write current level, said read current level, and said time period.

9. The apparatus of claim 8,
   wherein the means for altering said repair parameter collection member is further comprised of:
   means for increasing said repair parameter collection member.

10. The apparatus of claim 9, further comprising:
    means for logging said performance evaluation with said repair parameter collection into a repair performance log; and wherein the means for altering said repair parameter collection member is further comprised of:

means for reviewing said repair performance log to determine a repair direction; and means for altering said repair parameter collection member based upon said repair direction.

11. The apparatus of claim 7, further comprising:

means for detecting when said merged magnetoresistive read-write head contains a damaged pinned layer;

means for collectively performing said repair step collection when said merged magnetoresistive read-write head contains said damaged pinned layer.

12. The apparatus of claim 11, wherein the means for applying said write current level induces said temperate rise at said read head of essentially one hundred degrees Celsius.

13. The apparatus of claim 11, wherein said write current level is approximately at least 50 mA DC.

14. The apparatus of claim 1, wherein at least one of said means of claim 1 is comprised of at least one member of an implementation collection comprising:

a computer controlled by a program system containing at least one program step residing in a memory accessibly coupled to said computer is controllably coupled to at least one member of a current source collection comprising said read current source and said write current source;

a finite state machine controllably coupled to at least one member of said current source collection; and a neural network controllably coupled to at least one member of said current source collection;

wherein said implementation collection member implements at least part of said means.

15. A method of determining the presence of base line popping noise received by a read head operating at a read bias setting and accessing a rotating disk surface of a disk drive containing said rotating disk surface and said read head, comprising the steps of:

setting at least one threshold of a thermal asperity detector to a small Thermal Asperity threshold (TA threshold) providing a thermal asperity event indication; wherein said read head is communicatively coupled with said thermal asperity detector;

setting a read bias condition for said read head to said read bias setting; and counting said thermal asperity event indications when reading a zeroed track by said read head to determine said base line popping noise presence for said read head accessing said rotating disk surface at said read bias setting.

16. The method of claim 15, wherein said read bias condition is a member of a read bias condition collection comprising a read bias current and a read bias voltage.

17. The method of claim 15, further comprising the step of:

erasing a track of said rotating disk surface to create said zeroed track.

18. A method of determining a free base line popping condition collection for a read head within a disk drive free of base line popping noise for members of a read bias condition collection containing at least two of said read bias conditions, comprising for each member of said read bias condition collection, the steps of:

performing the method of claim 15 for said read head at said read bias condition collection member to determine said presence of base line popping noise; and selecting said read bias condition member as free of base line popping noise when said base line popping noise presence was not determined to create a member of said free base line popping condition collection.

19. A method of determining performance of said merged magnetoresistive read-write head of claim 18 to create a performance evaluation, comprising the steps of:

determining performance of said read head for said members of said free base line popping condition collection.

20. The method of claim 19, wherein the step determining performance is further comprised for each of said free base line popping condition collection members, of the steps of:

setting said read bias condition to said free base line popping condition collection member; and performing an Adaptive Read Channel Optimization for said read head at said free base line popping condition collection member.

21. A method of repairing said read head of claim 19, comprising a repair step collection including the steps of:

applying a write current level onto a write differential signal pair controlling a magnetic field produced by a write head to induce a temperature rise in a read head;

applying a read current bias onto a rad differential signal pair coupled to said read head to create a magnetic field within said read head; and maintaining said write current level onto said write differential signal pair and said read current bias onto said read differential signal pair for at least a time period.

22. The method of claim 21, further comprising the steps of:

determining performance of said merged magnetoresistive read-write head to create a performance evaluation;

passing said merged magnetoresistive read-write head when said performance evaluation indicates passing;

altering at least one member of a repair parameter collection based upon said performance evaluation when said performance evaluation indicates not passing;

collectively performing the repair step collection with said repair parameter collection when said performance evaluation indicates not passing;

wherein said repair parameter collection is comprised of said write current level, said read current level, and said time period.

23. The method of claim 22, wherein the step altering said repair parameter collection member is further comprised of the step of:

increasing said repair parameter collection member.

24. The method of claim 23, further comprising the step of:

logging said performance evaluation with said repair parameter collection into a repair performance log; and wherein the step altering said repair parameter collection member is further comprised of the steps of:

reviewing said repair performance log to determine a repair direction; and altering said repair parameter collection member based upon said repair direction.

25. The method of claim 21, further comprising the steps of:

detecting when said merged magnetoresistive read-write head contains a damaged pinned layer; and collectively performing said repair step collection when said merged magnetoresistive read-write head contains said damaged pinned layer.

26. The method of claim 21, wherein the step applying said write current level induces said temperature rise at said read head of essentially one hundred degrees Celsius.

27. The method of claim 21, wherein said write current level is approximately at least 50 mA DC.

28. A program system implementing said method of claim 21, comprising program steps implementing the steps of said method residing in a memory accessibly coupled to a computer contained in said disk drive.

* * * * *